United States Patent
Houldsworth et al.

(10) Patent No.: US 6,393,439 B1
(45) Date of Patent: May 21, 2002

(54) STORED DATA OBJECT MARKING FOR GARBAGE COLLECTORS

(75) Inventors: Richard J. Houldsworth, Horley; Steven Morris, Crawley, both of (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/337,845

(22) Filed: Jun. 21, 1999

(30) Foreign Application Priority Data

Jun. 20, 1998 (GB) .............................................. 9813266

(51) Int. Cl.[7] .............................................. G06F 17/30
(52) U.S. Cl. ..................................................... 707/206
(58) Field of Search .......................... 707/206; 711/165, 711/171, 103

(56) References Cited

U.S. PATENT DOCUMENTS 5,784,699 A * 7/1998 McMahon et al. ........... 711/171
6,047,295 A * 4/2000 Endicott et al. ............. 707/206
6,055,612 A * 4/2000 Spertus et al. ............... 711/165

OTHER PUBLICATIONS

Scalable hardware–algorithm for mark–sweep garbage collection Srisa–An, W.; Chia–Tien Dan Lo; Chang, J.M. Euromicro Conference, 2000. Proceedings of the 26th, vol.: 1, 2000 pp.: 274–281 vol. 1.*

Gupta, A.; Fuchs, W.K. Computer Software and Applications Conference, 1988. COMPSAC 88. Proceedings., Twelfth International, 1988 pp.: 324–328.*

"One Pass Real–Time Generational Mark–Sweep Garbage Collection", by J. Armstrong et al, pp. 313–322.

"Uniprocessor Garbage Collection Techniques", by P.R. Wilson, pp. 1–32.

"Garbage Collection: Algorithms for Automatic Dynamic Memory Management", by R. Jones et al, pp. 1–18.

* cited by examiner

*Primary Examiner*—Diane D. Mizrahi

(57) ABSTRACT

A data processing method and apparatus are described for mark-sweep garbage collection through stored data structures defined by data objects in a multi threading environment supporting the handling of finalizers. The sweeping stage consists of a linear sweep across the heap in which any objects with a mark-state of Deletable are deleted, while objects with finalizers and mark-state of pending are placed on a finalizers queue and marked. The number of objects with finalizers is tracked and compared with the known total allocated to the heap. If not all finalizable objects are found, a further marking operation is required to identify all objects reachable by finalizers. However, if all finalizable objects are found by the first marking operation, as indicated by a match between the found and stored totals, the marked unreachable objects may all be deleted in a single pass.

12 Claims, 2 Drawing Sheets

STORED DATA OBJECT MARKING FOR GARBAGE COLLECTORS

BACKGROUND OF THE INVENTION

The present invention relates to a method and apparatus for handling stored data objects and particularly, but not exclusively, to the handling of finalisation for objects in memory compaction and garbage collection procedures executing in real time in real or virtual memory space of a data processing apparatus.

Garbage collection is the automated reclamation of system memory space after its last use by a programme. A number of examples of garbage collecting techniques are discussed in "Garbage Collection: Algorithms for Automatic Dynamic Memory Management" by R. Jones et al, pub. John Wiley & Sons 1996, ISBN 0-471-94148-4, at pages 1 to 18. While the storage requirements of many computer programs are simple and predictable, with memory allocation and recovery being handled by the programmer or a compiler, there is a trend toward functional languages having more complex patterns of execution such that the lifetimes of particular data structures can no longer be determined prior to run-time and hence automated reclamation of this storage, as the program runs, is essential.

Finalization is a concept used in Sun Microsystems' Java ® and other current garbage-collected languages and programming environments, such as Modula-3 and Cedar. Stored data objects may have an associated finaliser which is to be executed after the object nominally becomes available for garbage collection but before the data is collected. The purpose of this feature is to allow an object to clean up any other system resources the object has claimed before it is destroyed. For example, the finaliser for a Java File object would close all the system file handles claimed by the object.

However, as a finalizer is just another of the class of object handling methods, with all the power of other methods, the finaliser procedure can access all data objects accessible from the object being finalized. Therefore, all objects reachable by a finaliser must be explicitly excluded from garbage collection. Furthermore, it is possible for the finalized method to resurrect any such objects reachable by a finalized including the object being finalised itself, by making the object reachable again. Consequently, a garbage collection procedure cannot delete any objects that are reachable from a finalized object until its finalized has executed and the reachability of the objects has been re-evaluated. In Java and other languages, the possibility of an object repeatedly resurrecting itself is typically removed by stating that the finalized for each instance is executed only once. This control on finalization will be assumed herein.

In PC's or workstations, the extra processing and memory load to support finalization is not usually a problem due to the amount of memory typically available in a PC, although the support will, of course, affect the overall efficiency. In low-memory environments such as set-top boxes, however, support for finalisers can cause problems and even a concurrent or incremental garbage collector may have to halt the program until it has executed some or all of the outstanding finalizer and reclaimed any memory used by them.

SUMMARY OF THE INVENTION

It is therefore an object of the present invention to provide an incremental garbage collection system which supports finalisable objects while minimizing the time-to-collection for these objects wherever possible.

In accordance with the present invention there is provided a garbage collection and marking method for traversing data structures formed of data objects linked by identifying pointers in a contiguous heap memory, with garbage collection of objects classed as deletable, the method comprising the steps of:

a) for a selected root object, traversing the pointers carried thereby to determine the objects linked to the root object; and b) traversing pointers to determine further objects linked to those identified by the previous step;

wherein step b) is repeated until no further pointers remain to be traversed following which the objects identified therein are classed as marked, wherein some of the heap data objects carry finalizers and some further objects are identified as potentially reachable by those finalisers which objects are classed as pending, wherein a first count is maintained of heap objects carrying finalizers and, for each traversal, if the detected total of objects carrying finalizer is less than the maintained first count, a further sweep is undertaken to identify and mark root objects for the remaining finalizer reachable objects, whilst if the detected and maintained totals match, those objects classed as pending are immediately reclassed as deletable with no further sweep undertaken.

The present invention also provides a data processing apparatus comprising a data processor coupled with a random access memory containing a plurality of data objects linked in data structures by identifying pointers and within a heap in a contiguous area of the memory, the apparatus further comprising first additional storage means containing for each heap object an identifier for one of a predetermined set of marking classes, and the processor being configured to effect the following operations on the stored plurality of data objects:

a) for a selected root object, traversing the pointers carried thereby to determine the objects linked to the root object; and b) traversing pointers therefrom to determine further objects linked to those identified;

wherein the processor repeats operation b) until no further pointers remain to be traversed following which the stored class identifiers for the objects identified therein are set as marked, wherein some of the heap data objects carry finalizers and some further objects are identified as potentially reachable by those finalisers which objects are classed as pending wherein the processor is coupled with means maintaining a first count of heap objects carrying finalizer and arranged to determine, for each traversal, if the detected total of objects carrying finalizer is less than the maintained first count, with the processor being configured to then undertake a further sweep to identify and mark root objects for the remaining finalizer reachable objects, whilst if the detected and maintained totals match, the processor is arranged to reclass as deletable all pending objects with no further sweep undertaken.

In operation, heap data objects carrying finalizer may suitably include a respective flag which, when set, prevents the object from being reclassed as deletable. In such an arrangement, the maintained first count may suitably be incremented on setting of the flag, and decremented on its removal. In order to cope with the occurrence, possible in incremental garbage collection, of the total number of heap objects carrying finalizer changing as the sweep progresses, a second count may be maintained of the ongoing number of marked finalisable objects detected during a sweep with this second count value being subtracted from the detected total of objects carrying finalisers at the end of the sweep and prior to comparison with the first count value.

Further features and advantages of the present invention will become apparent from reading of the following description of embodiments of the invention, and are recited in the attached claims to which reference should now be made.

BRIEF DESCRIPTION OF THE DRAWINGS

Preferred embodiments of the invention will now be described, by way of example only, with reference to the accompanying drawings, in which.

DESCRIPTION OF THE PREFERRED EMBODIMENTS

Figure 1:
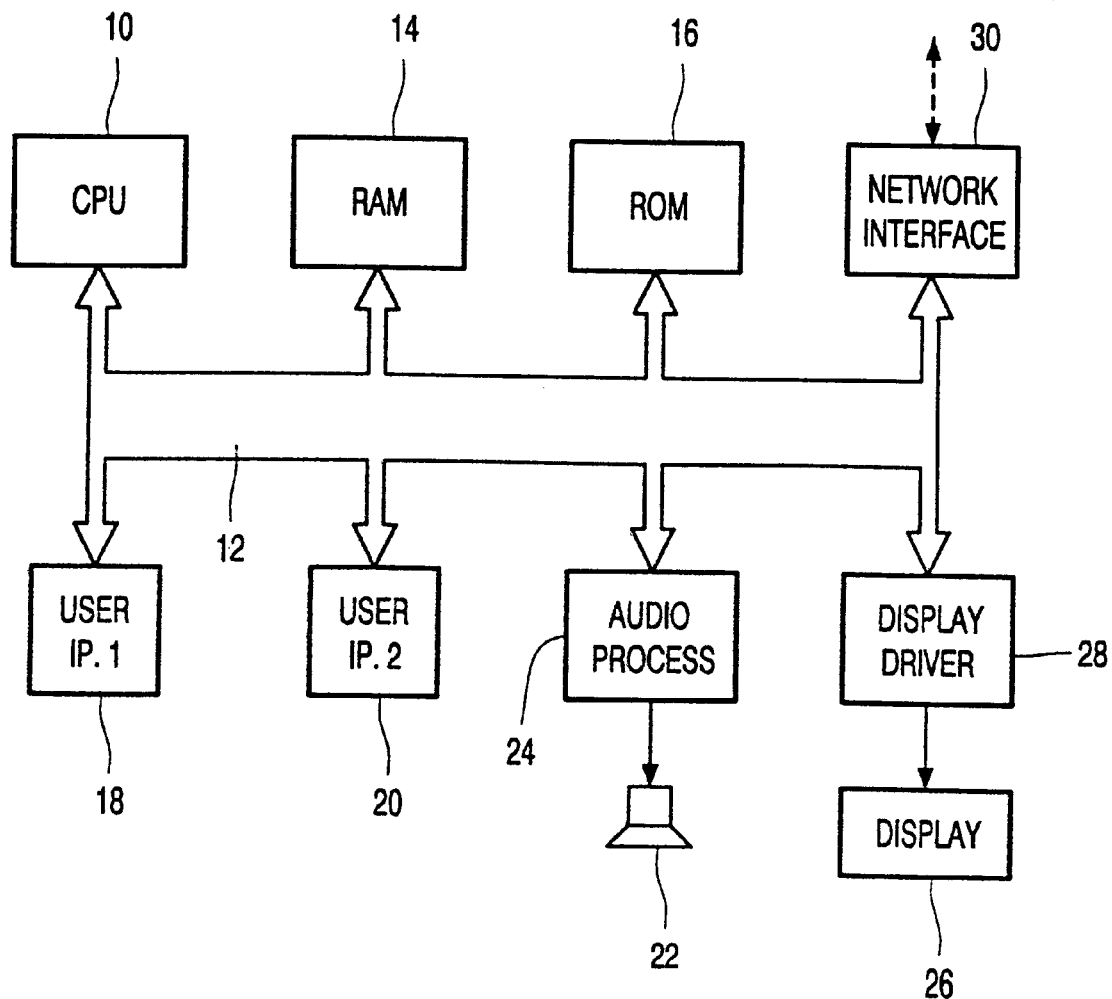
FIG. 1 is a block diagram of a data processing system suitable to embody the present invention.

FIG. 1 represents a data processing system, such as a personal computer, which acts as host for a number of software utilities which may, for example, configure the system as a browser for data defining a virtual environment. The system comprises a central processing unit (CPU) 10 coupled via an address and data bus 12 to random-access (RAM) and read-only (ROM) memories 14, 16. These memories may be comprised of one or several integrated circuit devices and may be augmented by a system hard-disk as well as means to read from additional (removable) memory devices, such as a CD-ROM. Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. Video output from the system is presented on display screen 26 driven by display driver stage 28 under control of the CPU 10. A further source of data for the system is via on-line link to remote sites, for example via the Internet, to which end the system is provided with a network interface 30 coupled to the bus 12.

The present invention is particularly embodied in memory management for a working area of the RAM 14 under control of the CPU 10; a controlling program for this may initially be held in ROM 16 and loaded up with the operating system on power-up. The following examples are compliant with concurrent garbage collection and memory management techniques in the Java (® Sun Microsystems Inc.) virtual machine and the terminology should be construed accordingly: it will be recognised however that the present invention is not restricted to Java-compliant systems, to concurrent (or incremental) garbage collection, nor to purely virtual memory management.

In the following, a number of particular terms having special meaning will be used, as follows. Root objects are globally accessible stored data objects in systems: in Java, these are represented by static data fields and stacks. Reachable objects are stored data objects connected to the data structure headed by the root objects of the system: during garbage collection, the marking process should find all reachable objects in one garbage collection cycle. Non-reachable objects are those stored data objects not connected to the data structure; they are inaccessible to running programs and are hence candidates for garbage collection.

Finalisable objects are data objects which have nominally become garbage as they are non-reachable, but which also have a non-empty finaliser that has not yet been executed. A finaliser may only be executed once, so an object is considered finalisable if its finaliser has not yet been executed by the garbage collector. Finalizer reachable objects are a subset of the group of non-reachable objects which can be reached through tracing from finalisable objects: these objects should not be garbage collected.

Mutator threads are threads of execution in an incremental garbage collection system: the name comes from their effect of mutating the heap memory holding the stored data objects concurrently with the garbage collection threads, while a garbage collection thread is a dedicated system thread whose purpose is to collect garbage objects and create more free space in the heap. A finaliser thread is a dedicated system thread which will run finalization, code for unreachable objects with finalisers.

The detection period is the time period between the last reference to an object being removed and its detection as an unreachable object. In mark-sweep collectors this is determined by the duration of the marking cycle. The reclamation period is the time between an object being detected as non-reachable and the point at which it is deleted. In mark-sweep garbage collectors, this is determined by the duration of the sweep cycle and the presence of finalizable objects.

By way of illustration, it will be useful to first consider a commonly used technique for finalising garbage collection, used for example in the Sun Java® Virtual Machine v1.0.2. The typical non-finalising garbage collection cycle can be described independently of implementation details as firstly the partition of the heap into reachable and non-reachable sets of data objects, followed by garbage collection of the non-reachable set. Finalization complicates garbage collection by adding a new stage to each garbage collection cycle, such as to comprise partition of heap into reachable and non-reachable sets, as before. This is followed by partition of the non-reachable set into garbage and finalizer reachable sets and finally garbage collection is implemented on the garbage set and execution is implemented on the finalizer reachable set.

This lengthening of the cycle means that the lag between objects becoming non-reachable and their collection is made greater, with the consequence that a larger proportion of the heap is used up by garbage objects and therefore a smaller area of the heap is available for new data items. Also, the strong dependencies between the stages in the cycles mean that most implementations will have poor concurrency characteristics, with large pauses in the mutator threads as the garbage collection algorithm proceeds. Considering that the number of finalizable objects in a typical system is a small percentage of the set of active objects, the added overhead of finalizer support is disproportionately large. The state of each object in the system is identified by two variables M and F, where M may be Marked (including any other mark states) or Unmarked, and F can indicate Finaliser or No Finaliser.

Figure 2:
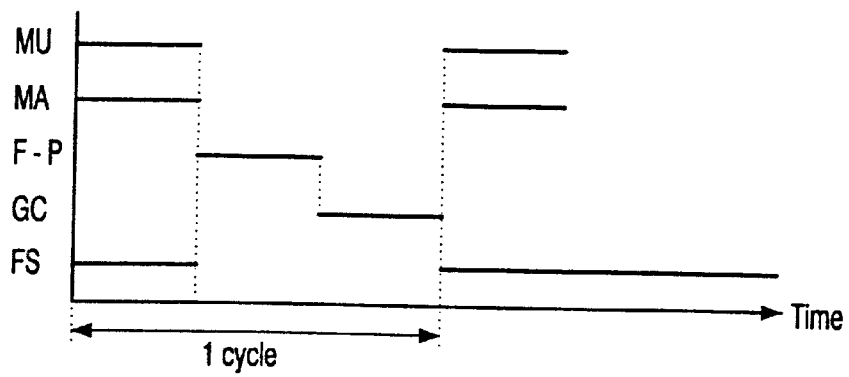
FIGS. 2 to 4 represent concurrency of marking and sweeping operations in prior art and first and second embodiments of the present invention respectively.

The separate tasks relevant to the garbage collector and their interaction in the simple system are shown in FIG. 2. The mutator threads MU may create new objects in the heap at any time. The marking stage MA involves the tracing of objects from root objects. Objects found by this tracing have M=Marked, and marking can be performed in the garbage collection thread or, in the illustrated case of incremental garbage collection, in the mutator threads. The finaliser partitioning F-P involves sweeping over the heap placing objects with M=Unmarked and F=Finalizer in a queue, then a mark phase using finalisable objects as roots: this runs in the garbage collection GC thread. The finalization stage FS involves the execution of finalizers in the queue, and sets F=No Finaliser for objects after execution. This may run in the garbage collection GC thread or, as shown, in a dedicated finaliser thread FS.

This technique has some poor characteristics, the first of which is poor concurrency with the steps of mark phase MA, finaliser partition F-P, and garbage collection sweep GC occurring serially. Consequently, the inherent independence between the tasks cannot be exploited in a multi-threaded system. Another problem is the generally long reclamation times for all objects. For non-finalizer-reachable garbage (which will be the vast majority), no garbage will be collected in this cycle until the finaliser partition F-P is completed. This is wasteful as the objects will have been examined during the finalisation partition F-P anyway. With incremental garbage collection algorithms, the system pause for mutators whilst finaliser partition F-P and the garbage collection GC sweep occur is unacceptably long, taking up two complete sweeps over the heap plus the finaliser-reachable marking phase.

Figure 3:
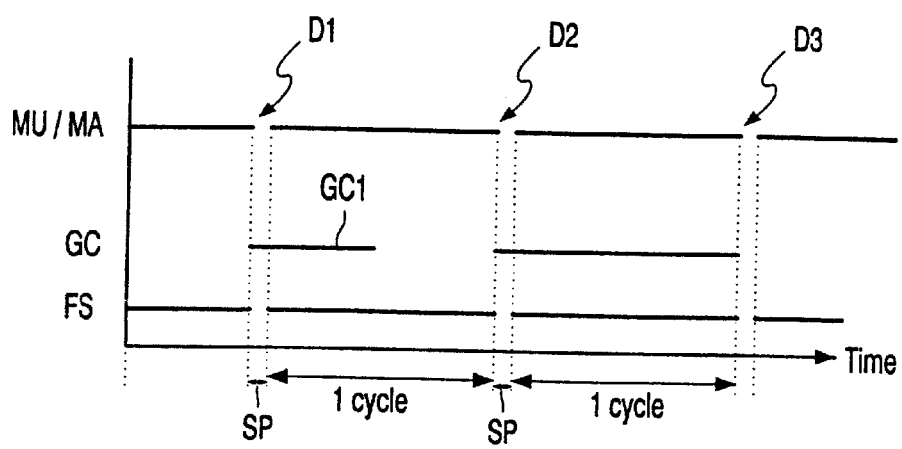

In order to reduce these delays, a different way of partitioning tasks between threads for more efficient use of multi threading is required, whilst retaining the capability for efficiently handling finalizers. A first improvement is achieved by pipelining the marking and sweeping states which results from expanding the number of marking states, such that M may be Marked, Unmarked, Pending or Deletable, with only 2-bits required per object for storing M, as described in our co-pending WO application claiming priority from United Kingdom patent application 9813264.0 entitled "Finalisation in Incremental Garbage Collectors". By way of further example, FIG. 3 shows the resultant concurrency of marking and sweeping in this four mark-state arrangement. As with the FIG. 2 example, mutators MU are performed modifying or creating new objects on the heap, whilst the marking phase MA in tandem with the mutator handling marks objects accessible from the root objects. M=Marked is set for found objects with a synchronisation point SP (to be described below) occurring on completion. This may be performed in any threads.

The sweeping stage GC consists of a linear sweep across the heap in which any objects with M=Deletable (detected non-reachables) are deleted at point D1, whilst objects with M=Pending and F=Finaliser are placed on a finaliser queue and marked. Sweeping is performed in the garbage collection thread as indicated at GC1 and, on completion, waits for the synchronisation point SP. The finalizers stage executes finalizers for objects on the finaliser queue and sets F=No Finalizing after running at point D2. Finalising is performed in the garbage collection thread or a dedicated finalizing thread.

The method includes a synchronisation point (as mentioned above) where the results of the mark phase are passed onto the sweeping phase. The next mark phase and the sweep cycle may both begin immediately after the synchronisation point SP: although the sweep thread may, as shown, commence at the start of the synchronisation point SP, it will just handle matters such as state changes and so forth until SP is concluded when the actual sweep commences. The synchronization point itself performs the following operations:

1. Rotate or shift M for all objects; this operation converts the systems perception of the stored code (e.g binary 10) indicating Marked to indicate Unmarked following rotation, with similar conversion for Unmarked to Pending, and Pending to Deletable. Rather than requiring a sweep over all of the objects, and alteration of all the respective stored mark state bits, this operation is performed by rotating or shifting the meanings of the mark state bits.

2. Assign the new root objects for the next mark phase, including those objects in the current finalisation queue.

Adding the new mark states together with an efficient method of rotating the states allows software pipelining of the finaliser-reachable scan and the garbage scan. It takes two garbage collection cycles to move an Unmarked object to the Deletable state (point D3 in FIG. 3), which is long enough to detect finaliser-reachability in the intervening mark phase. The merging of the root marking and finalizer reachable marking reduces code size and also eliminates the need for finalizer partition (F-P; FIG.2) to separate finalizer reachable objects. The short synchronisation point SP is the only point at which the mutator threads are blocked. This method therefore has excellent incremental and multi-threading performance as the sweep, finaliser and mutator threads operate with a high degree of independence. The cycle time is shorter too, as each cycle consists of only one mark phase and one sweep operating concurrently. Due to this, and the high proportion of the cycle for which the marking process is active, the detection period for non-referenced objects is also likely to be reduced.

In operation, the garbage collection sweep triggers marking of the finalizer reachable set when it comes across objects in the Pending state. Thus the sweeper effectively drives the marking process in contrast to conventional mark-sweep processes where the marker is driven by an independent root set held outside the heap.

There is a less satisfactory aspect in that the reclamation period for the process is still high. Garbage objects will be collected within two cycles from the synchronisation point at which they will have been identified as unreachable (the state transition from Unmarked to Pending). In the vast majority of cycles, no new finalisable objects become unreachable, and in these cycles, all Pending objects will become Deletable on the next cycle, so they could theoretically be deleted in the Pending cycle. This follows from the particular characteristics of finalizers objects in the Pending state, which characteristics are utilised in the present invention to improve the efficiency of garbage collection for finalizers whether in an incremental system as described above with reference to FIG. 3, or more sequential mark-then-sweep arrangements.

An embodiment will now be described as an enhancement to the four mark-state technique described above with reference to FIG. 3, the embodiment providing a means for reliably detecting whether objects in the Pending state can safely be deleted. This procedure is performed by tracking the number of objects with finalisers that have been found during marking, and comparing with a known and stored total allocated in the heap. As the finalizable queue is included in the marking process, the only finalisables not located during marking are those that have become non-reachable during the previous collection cycle. When not all finalisable objects have been located in the previous mark phase, then there is a non-empty set of finalizers reachable objects to identify in the sweep. However, when all finalizables are accounted for, all Pending objects are known to be garbage, and can be deleted immediately.

The object states are as for the FIG. 3 example, but with three new global variables added:

| | |
|---|---|
| finalizer_count | A count of the total number of finalisable objects in the heap |
| found_count | The number of finalizer-reachable objects located during the mark process |
| shortcut | A flag indicating how the sweep process should behave this cycle. |

Figure 4:
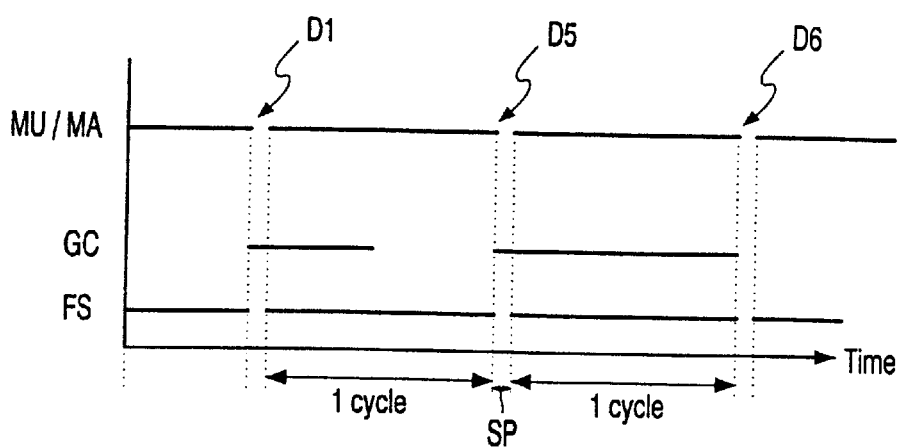

The tasks are carried out generally as for the FIG. 3 example, but with some exceptions as illustrated by FIG. 4. In the case of the mutators, if a new object has F=Finaliser then finaliser_count is incremented. During marking, if a found object has F=Finalizer, then found_count is incremented. During sweeping, if the variable "shortcut" is true, then both M=Pending and M=Deletable are deleted at point D5; if "shortcut" is false, then any objects with M=Deletable will be deleted and any objects with M=Pending and F=Finaliser are placed on the finaliser queue and marked for subsequent deletion at point D6. finalizer is handled as before but, after running the finaliser thread for an object, F is set to No Finalizer, the object is marked, and both found_count and finaliser_count are decremented.

The procedure applied at the synchronisation point now includes evaluation of the count variables where, after rotating the meaning of M and assigning the root objects, the variable "shortcut" is set to the result (found_count= finaliser_count).

When the technique is applied to an incremental garbage collector as described, the finaliser_count may change during the marking traversal. To make the counts consistent, the found_count must not include any objects found during the mark traversal or the comparison will yield the wrong result. In order to avoid this, during traversal found_count may have 1 subtracted if a marked finalisable object is encountered. Alternately, a second ongoing count processed_count may be maintained to record the number of marked finalisers encountered during a sweep, with processed_count being deleted from found_count before comparison with finaliser_count.

FIG. 4 shows this optimised finalization model with additional reclamation through use of the "shortcut" variable: as will be recognized, in comparison with the FIG. 3 technique, that of FIG. 4 guarantees 1-cycle reclamation when no finalizers are used and a maximum of 2-cycle reclamation or all non-finalizer-reachable data objects.

In the generally rare event that data structure containing more than one finalizable object becomes non-reachable, the number of finalisables detected this cycle becomes uncertain due to a race condition between the marking process and the progress of the scan. For example, object F1 is found by the sweep, added to the finalisation queue, and marked: F1 references another finalisable object F2, which is also non-reachable in this cycle. Depending on the behaviour of the marking algorithm, F2 may be reached by the marker before or after the first sweep reaches it. F2 is only added to the finalization list this cycle if the sweeper reaches it first. A possible solution would be to place objects on the finalising queue as they are marked, such that the same actions will be taken for an object regardless of whether it is found by the sweep or marking process.

An aggressive marking algorithm will tend to prevent lower finalization in a connected data structure from entering the queue during the same cycle as the top levels of the structure, leading to a semi-topological ordering of finalisers. This typically aids recycling rates as higher objects in a data structure will have a larger reachable set than lower terms, and will therefore tend to make more objects unreachable on deletion.

Conversely, marking of finalisables located during the sweep may be delayed until the sweep completes, such that all newly non-reachable finalizables will be added to the finalization queue. This aids predictability, and permits a strengthening of the reclamation period definitions: 1-cycle reclamation is guaranteed when no non-reachable finalization objects are detected in the previous marking phase.

Although defined principally in terms of a software browser implementation, the skilled reader will be well aware than many of the above-described functional features could equally well be implemented in hardware or a combination of hardware and software.

From reading the present disclosure, other modifications will be apparent to persons skilled in the art. Such modifications may involve other features which are already known in the design, manufacture and use of image processing and/or data network access apparatus and devices and component parts thereof and which may be used instead of or in addition to features already described herein.

What is claimed is:

1. A garbage collection and marking method for traversing data structures formed of data objects linked by identifying pointers in a contiguous heap memory, with garbage collection of objects classed as deletable, the method comprising the steps of:

a) for a selected root object, traversing the pointers carried thereby to determine the objects linked to the root object; and b) traversing pointers to determine further objects linked to those identified by the previous step;

wherein step b) is repeated until no further pointers remain to be traversed, in such a fashion that, I. the objects identified therein are classed as marked, II. some of the heap data objects carry finalisers, III. some further objects are identified as potentially reachable by those finalizers, which objects are classed as pending, IV. a first count is maintained of heap objects carrying finalizers and, V. for each traversal, A) if the detected total of objects carrying finalizers is less than the maintained first count, a further sweep is undertaken to identify and mark root objects for the remaining finalizer-reachable objects, while B) if the detected and maintained totals match, those objects classed as pending are immediately reclassed as deletable with no further sweep undertaken.

2. A method as claimed in claim 1, wherein heap data objects carrying finalizers include a respective flag which, when set, prevents the object from being reclassed as deletable.

3. A method as claimed in claim 2, wherein the maintained first count is incremented on setting of the flag, and decremented on its removal.

4. A method as claimed in claim 1, wherein heap data objects carrying finalizers and classed as pending, when located during traversal, are placed in a finalization queue for execution of their finalizers.

5. A method as claimed in claim 1, wherein a second count is maintained of the ongoing number of marked finalizable objects detected during a sweep and, at the end of the sweep, the second count value is subtracted from the detected total of objects carrying finalizers prior to comparison with the first count value.

6. A data processing apparatus comprising a data processor coupled with a random access memory containing a plurality of data objects linked in data structures by identifying pointers and within a heap in a contiguous area of the memory, the apparatus further comprising first additional storage means containing for each heap object an identifier for one of a predetermined set of marking classes, and the processor being configured to effect the following operations on the stored plurality of data objects:
   a) for a selected root object, traversing the pointers carried thereby to determine the objects linked to the root object; and
   b) traversing pointers therefrom to determine further objects linked to those identified;
   where the processor repeats operation b) until no further pointers remain to be traversed, in such a fashion that:
      I) the stored class identifiers for the objects identified therein are set as marked,
      II) some of the heap data objects carry finalizers
      III) some further objects are identified as potentially reachable by those finalizers which objects are classed as pending
      IV) the processor is coupled with means maintaining a first count of heap objects carrying finalizers and
      V) the processor is arranged to determine, for each traversal,
         A) if the detected total of objects carrying finalizers is less than the maintained first count, with the processor being configured to then undertake a further sweep to identify and mark root objects for the remaining finalizer-reachable objects, while
         B) if the detected and maintained totals match, the processor is arranged to reclass as deletable all pending objects with no further sweep undertaken.

7. Apparatus as claimed in claim 6, wherein the processor is arranged to delete those objects reclassed from pending to the same time as deleting those objects already classed as deletable.

8. At least one medium, readable by at least one processing device, embodying
   data structures comprising
      a) data objects, some of which are marked as deletable;
      b) identifying pointers linking the data objects in a contiguous heap memory, with garbage collection of objects classed as deletable, and
   code for causing the at least one data processing device to perform at least the following garbage collection and traversal operations:
      a) for a selected root object, traversing the pointers carried thereby to determine the objects linked to the root object; and
      b) traversing pointers to determine further objects linked to those identified by the previous step;
      c) repeating operation b) until no further pointers remain to be traversed, such that:
         A) the objects identified therein are classed as marked,
         B) some of the heap data objects carry finalizers,
         C) some further objects are identified as potentially reachable by those finalizers, which objects are classed as pending,
         D) a first count of heap objects carrying finalizers is maintained, and,
         E) for each traversal,
            i) if the detected total of objects carrying finalizers is less than the maintained first count, undertaking a further traversal to identify and mark root objects for the remaining finalizer-reachable objects, and
            ii) if the detected and maintained totals match, immediately reclassing those objects classed as pending as deletable with no further traversal.

9. At least one medium as claimed in claim 8, wherein heap data objects carrying finalizers include a respective flag which, when set, prevents the object from being reclassed as deletable.

10. At least one medium as claimed in claim 9, wherein the maintained first count is incremented on setting of the flag, and decremented on its removal.

11. At least one medium as claimed in claim 8, wherein heap data objects carrying finalizers and classed as pending, when located during traversal, are placed in a finalization queue for execution of their finalizers.

12. At least one medium as claimed in claim 8, wherein a second count is maintained of the ongoing number of marked finalizable objects detected during a sweep and, at the end of the sweep, the second count value is subtracted from the detected total of objects carrying finalizers prior to comparison with the first count value.

* * * * *